Figure 1:
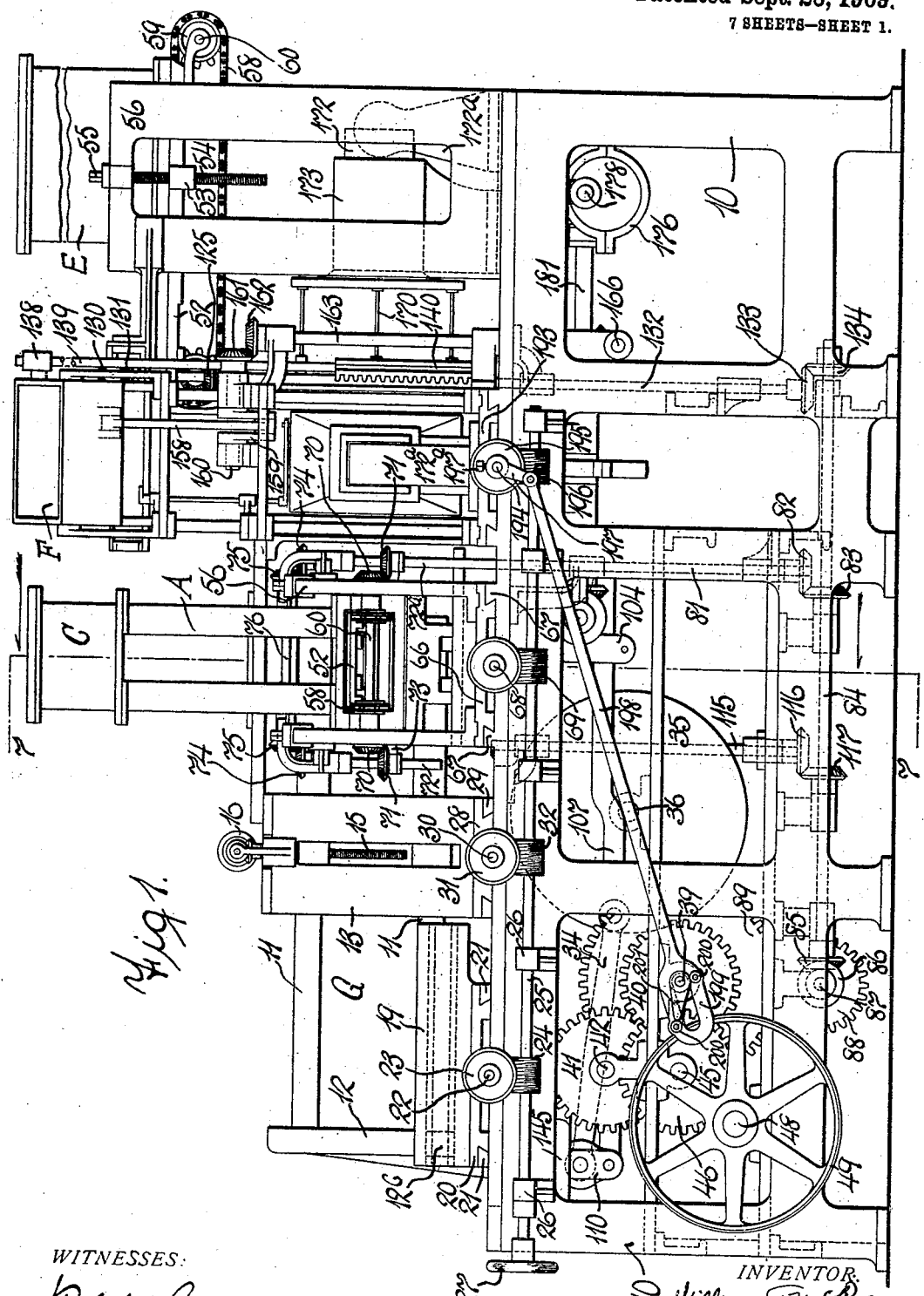

W. T. McRAE.
BOX MACHINE.
APPLICATION FILED MAR. 19, 1908.

935,534.

Patented Sept. 28, 1909.
7 SHEETS—SHEET 4.

WITNESSES:

INVENTOR.
William T. McRae
BY
W. B. Hutchinson,
ATTORNEY.

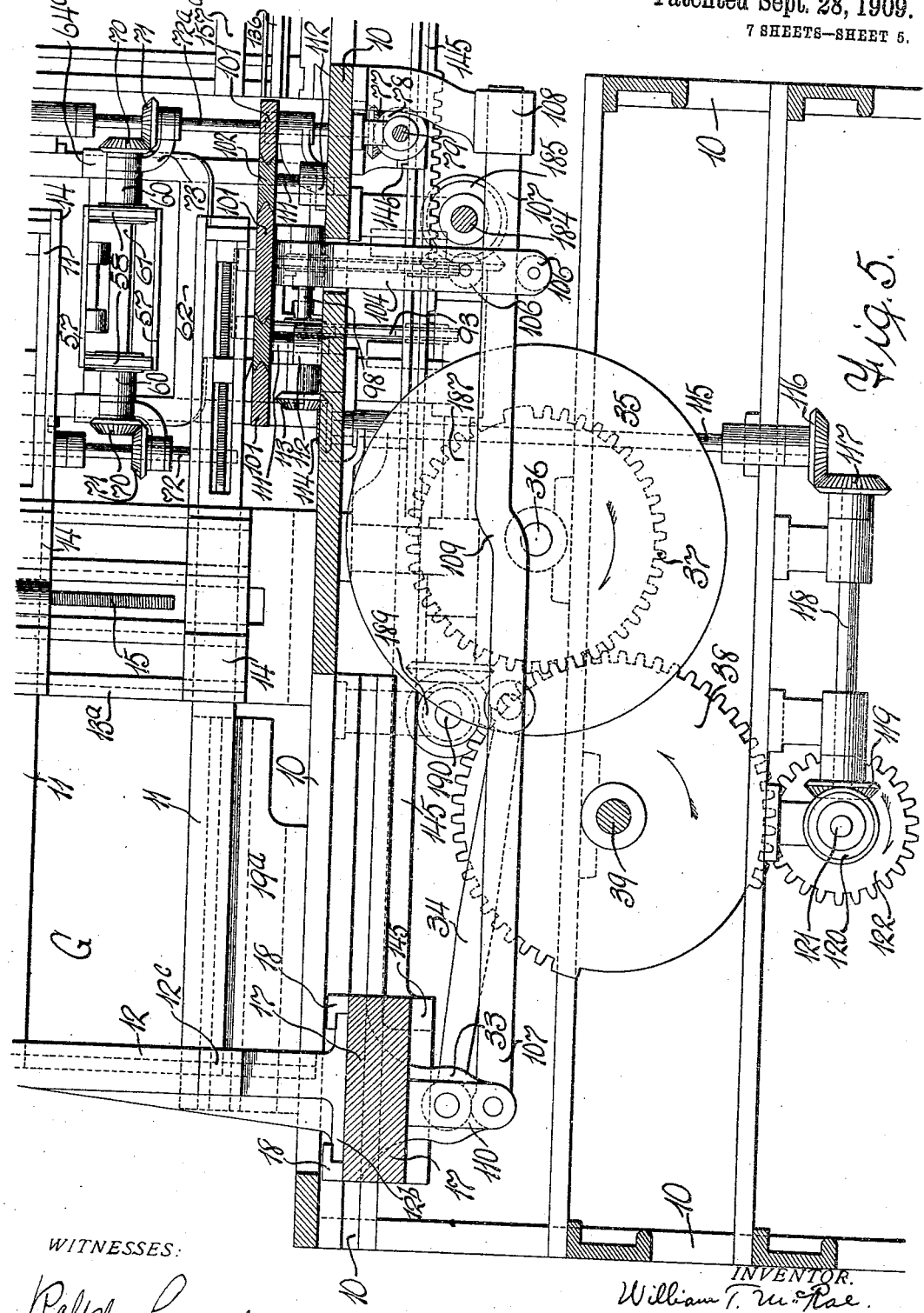

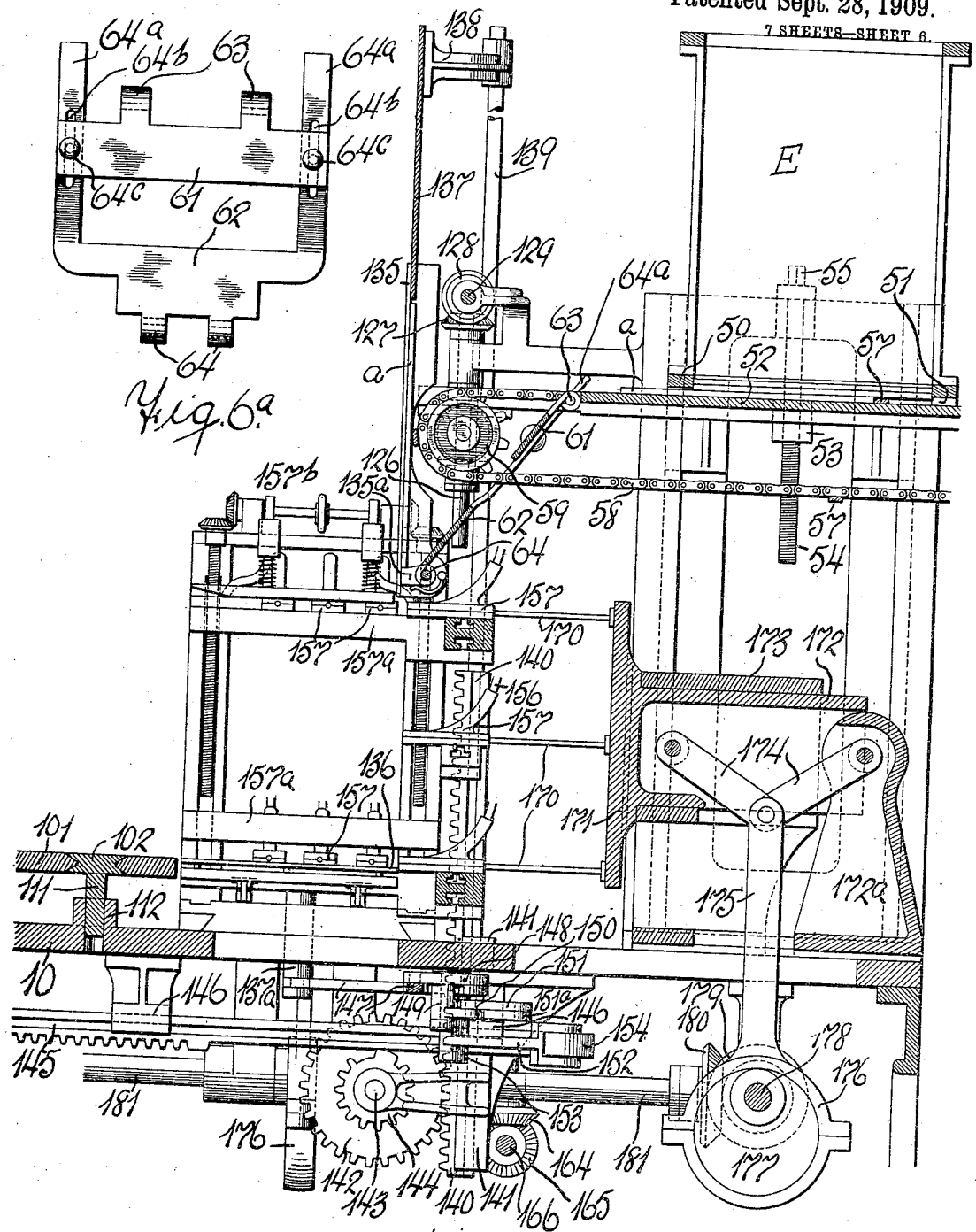

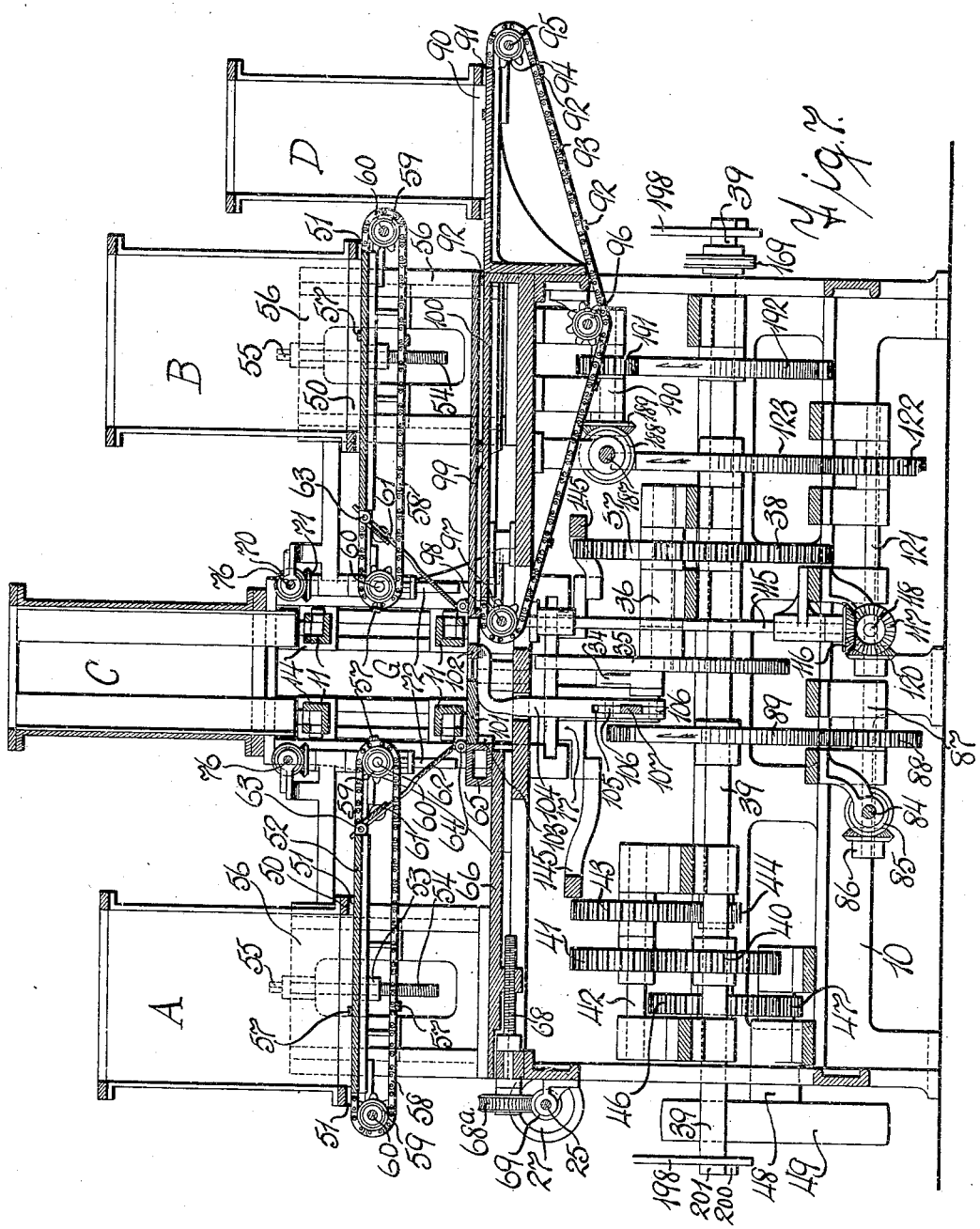

UNITED STATES PATENT OFFICE.

WILLIAM T. McRAE, OF PHILADELPHIA, PENNSYLVANIA, ASSIGNOR TO JOHN D. RISHELL, TRUSTEE, OF NEW YORK, N. Y.

BOX-MACHINE.

935,534.   Specification of Letters Patent.   Patented Sept. 28, 1909.

Application filed March 19, 1908. Serial No. 422,067.

*To all whom it may concern:*

Be it known that I, WILLIAM T. McRAE, of the city of Philadelphia, county of Philadelphia, and State of Pennsylvania, have invented a new and useful Improvement in Box-Machines, of which the following is a full, clear, and exact description.

My invention relates to improvements in box machines, and the object of my invention is to produce a machine in which boards for packing cases can be placed in hoppers on the machine, assembled around a form, nailed or otherwise fastened together to complete the box, and then discharged.

More particularly my invention is intended to improve a machine with the above named general object so as to provide a very complete and perfect mechanism or organization of mechanisms for accomplishing said result. My invention is intended, for instance, to produce a very simple and satisfactory means for feeding the end, side, and bottom boards of a box from their respective hoppers and assembling them in the right relation around a form.

My invention comprises also details for adjusting the several parts, and more particularly the form, the hopper, and the stock feeds, all to the end that a practical machine can be produced for making wooden boxes or packing cases in a cheap and thorough manner.

Reference is to be had to the accompanying drawings forming a part of this specification, in which similar reference characters indicate corresponding parts in all the views.

Figure 2:
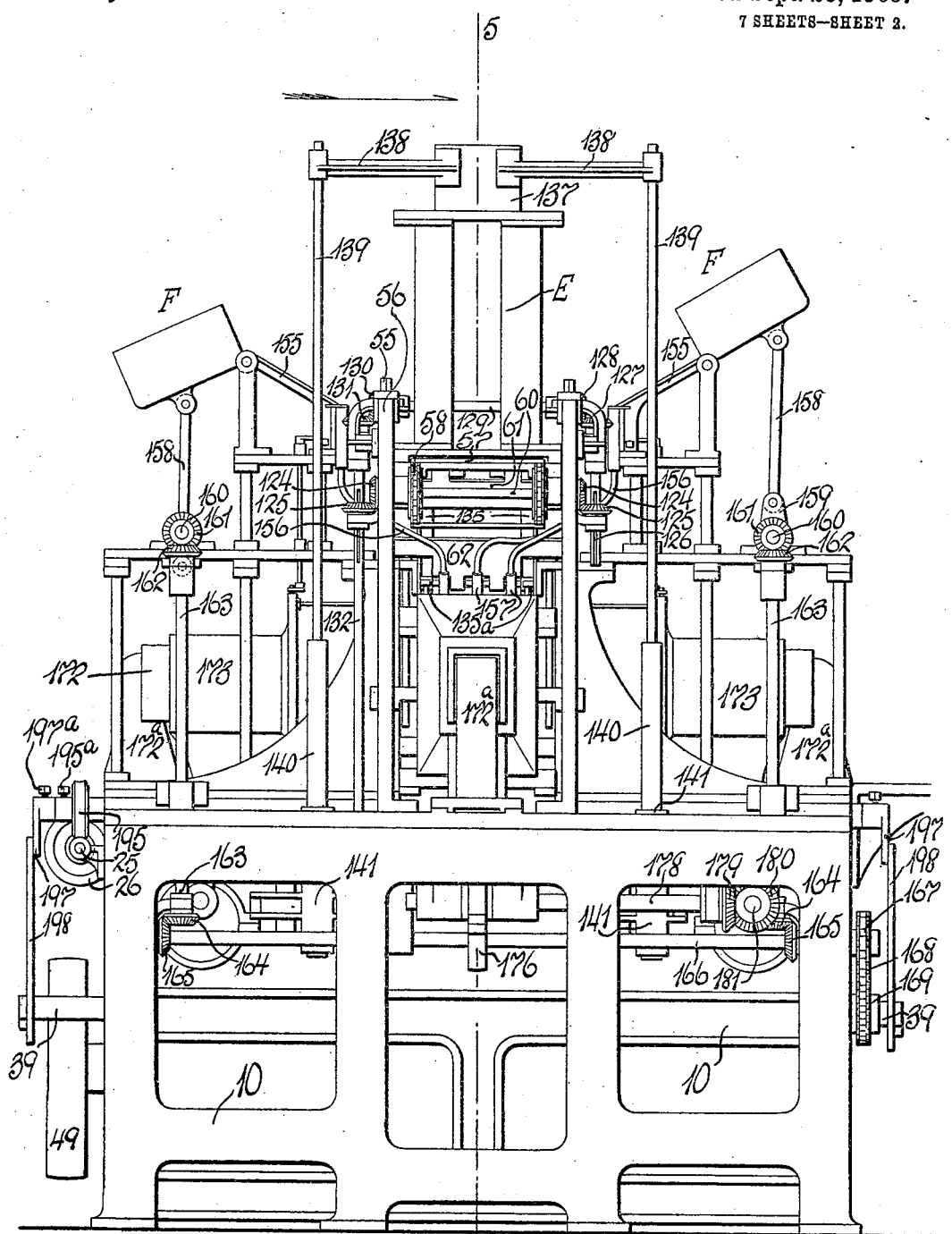
Figure 3:
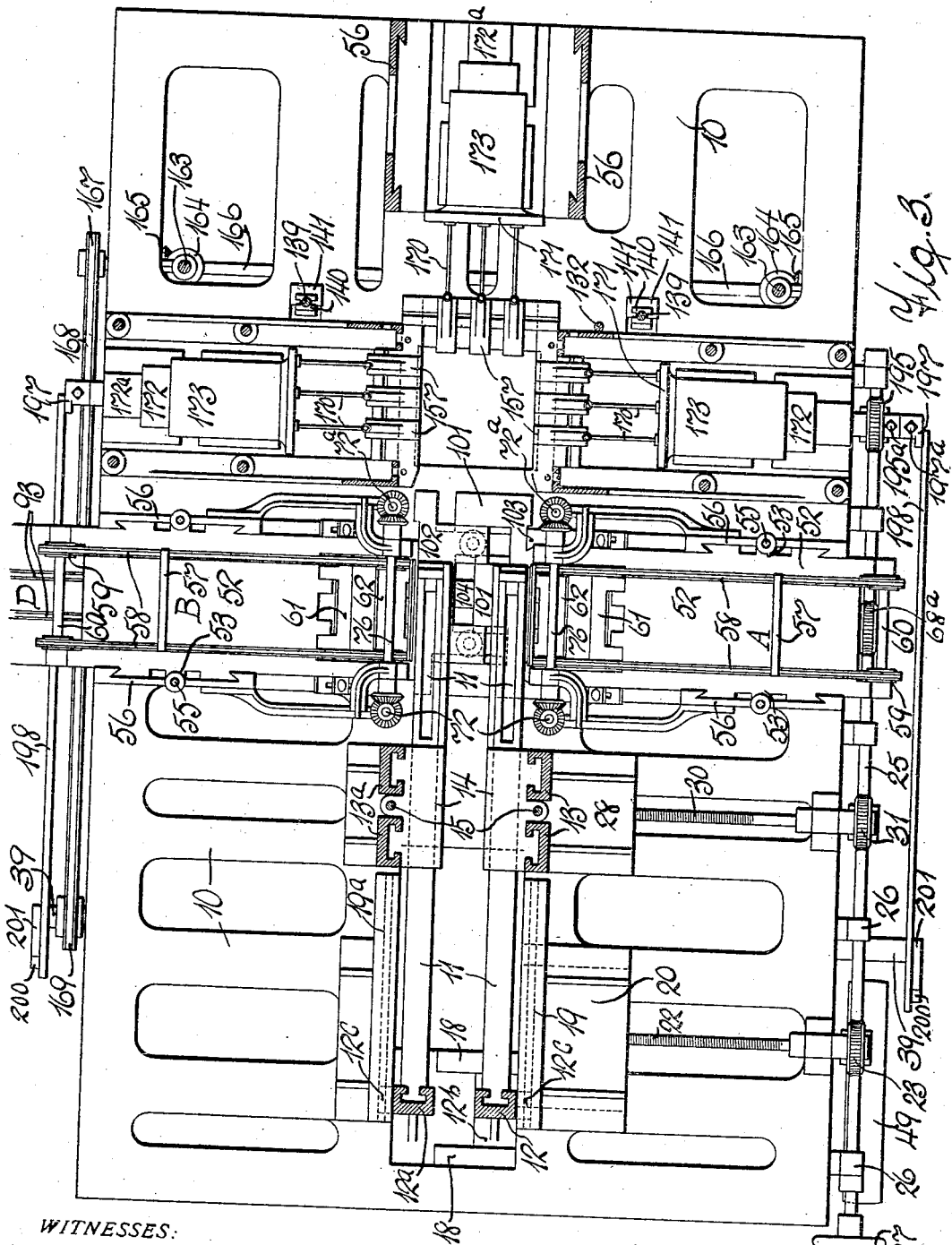
Figure 4:
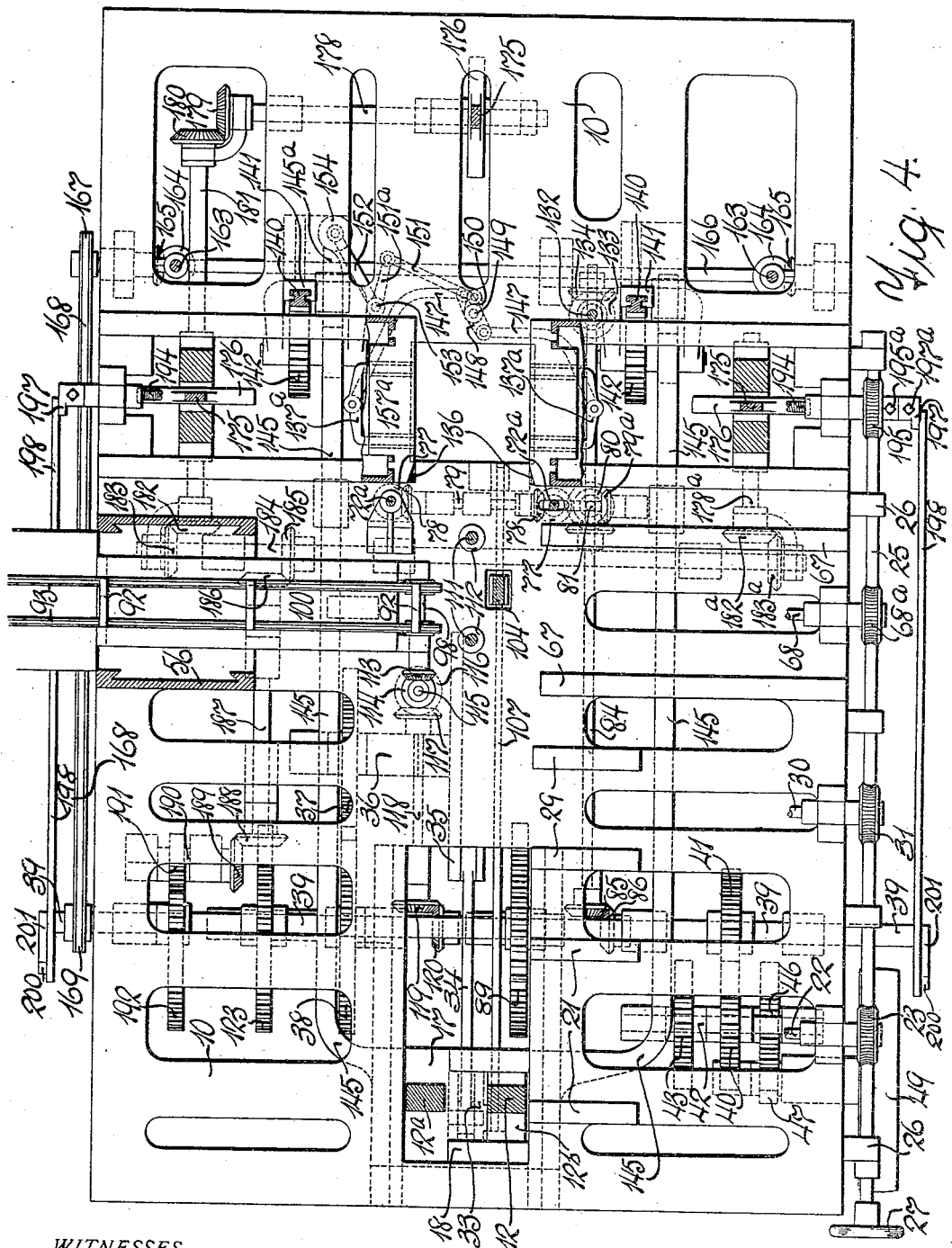

Figure 1 is a right hand elevation of the machine embodying my invention. Fig. 2 is a rear elevation of the machine. Fig. 3 is a sectional plan of the machine with the hoppers removed. Fig. 4 is also a sectional plan but on a little lower plane than Fig. 3, showing the driving mechanism more particularly. Fig. 5 is an enlarged section of a part of the machine on the line 5—6 of Fig. 2. Fig. 6 is an enlarged detail section on the line 5—6 of Fig. 2, the views 5 and 6 being read together to form a complete view. Fig. $6^a$ is a detail of one of the inclined guides for guiding a board to position against the form, and Fig. 7 is a cross section on the line 7—7 of Fig. 1.

The machine is provided with a suitable frame on which are arranged the hoppers A, and B for the opposed side boards, the hopper C for the top end board, the hopper D for the bottom end board and the hopper E for the bottom board of the box. I have also indicated the form around which the boxes are formed by the letter G, and have indicated by the letter F the general nailing arrangement, although this is not shown in detail as it forms no part of the present invention. In Fig. 3 I have placed the letters A and B to show the points above which said hoppers are located.

The form G is substantially like the form which I have shown and described in another application 422,068 filed simultaneously herewith, and I therefore will not go into the detail construction of it. It comprises four rectangularly arranged bars 11, the upper pair of which are adjustable on the supports 12 and $12^a$ forming a part of the sliding head or carriage which will be referred to more particularly below, and the form bars are supported in and slide through upright frames 13 and $13^a$, which have boxes (see Fig. 3) for the reception of the said bars. The upper pair of bars 11 of the form G are adjustable by means of the screws 15 on the gearing 16, which are not referred to in detail because they are similar to the corresponding parts in the other application referred to. The uprights or supports 12 and $12^a$ are provided with T shaped grooves so that the upper bars 11 of the form can slide in them, and the upright 12 is provided with a flange $12^b$ which slides on the body 17 of the carriage, being laterally adjustable in the ways 18 (see Fig. 5). The uprights 12 have also flanges $12^c$ which slide longitudinally in the guide frames 19 and $19^a$ (see Fig. 3) and on one side of the machine the frame 19 is adjustable in and out with relation to the frame $19^a$, having a base 20 for this purpose which moves in the slide-way 21 (see Fig. 1) and is connected to a screw shaft 22 having thereon a worm wheel 23 meshing with a worm 24 on the shaft 25 which runs along the side of the machine as shown in Figs. 1, 3 and 4, and the said shaft is held in suitable bearings 26, and provided with a hand wheel 27 for turning it. A similar connection is made between the shaft 25 and other parts of the machine, to wit:—the form, the stock feed, and assembling devices, so that by turning the shaft all the said parts can be simultaneously adjusted laterally, as will presently appear. It will be seen by the arrangement just described that the form can be adjusted vertically by means of the screws 15, as in my other application, and that it can be adjusted laterally by means of the screw mechanism just described.

To provide for the adjustment laterally of the frames 13 and 13ª, the frame 13 has a base 28 mounted in the slide-way 29 (see Fig. 1), and this connects by a screw shaft 30 and worm gears 31 and 32 with the shaft 25 just referred to.

The means for advancing the form G and also for retracting it, is as follows. On the under side of the body 17 of the carriage is a lug 33 which connects by means of a pitman 34 with the crank disk 35 and countershaft 36 (see Figs. 1, 5 and 7). The counter shaft 36 is provided with a mutilated gear 37 (see Fig. 7) which connects with a gear 38 on the main driving shaft 39 which extends across the machine, and this connects by gears 40 and 41 with a counter shaft 42, and the latter connects by gears 43 and 44 with the shaft 45 (see Fig. 1) while the latter connects by gears 46 and 47 with the shaft 48 on which is the driving pulley 49.

At the bottom of the hoppers A and B are the vertically adjustable frames 50 on which the hoppers rest, and these have openings 51 therethrough which provide for feeding a side board beneath the frame and on the table 52 which forms the hopper bottom, and which is adjustable vertically, the table to this end having nuts 53 which engage the vertical screw shafts 54, and the latter are provided with squared ends 55 at the top to receive a wrench and engage the frames 56 in which the frames 50 and the hoppers which they carry, are adjustable. The stock is fed inward from each hopper A and B by the abutments 57 which slide along each table 52 and extend transversely across the table (see Fig. 7). These abutments are suitably spaced and are carried by the sprocket chains 58, and these chains run over sprocket wheels 59 at the outer and inner ends of the chains, the outer wheels being carried by the shaft 60 and the inner sprocket wheels being carried by studs 60ª, provision thus being made for feeding in the stock and permitting it to drop through the chains upon the inclined guides, each formed of the parts 61 and 62, thus bringing the board into position to be up-ended against one side of the form G, that is against the bars 11 on the form. The inclined guide is shown in detail in Fig. 6ª, and its use appears clearly in Figs. 6 and 7. The part 61 is hinged as shown at 63 to the inner edge of the table 52 which forms the hopper bottom, and the lower part 62 is hinged as shown at 63 to the knuckle 65 on the slide base 66, and space is left between the two parts 61 and 62 to provide for the vertical adjustment of the hopper bottom, that is, of the table 52. When a side board is fed inward by an abutment 57, it falls by gravity over the inner edge of the table 52 and slides down the inclined guides 61 and 62 against the form bars 11, and the continued movement of the abutment 57 carries the board snug up against the form bars.

Referring again to the inclined guides 61 and 62, it will be seen by reference to Fig. 6ª that the lower part 62 has upwardly extending arms 64ª outside the chains, and the upper part 61 overlaps the arm 64ª, and has a sliding connection therewith by means of the slot 64ᵇ on the arm 64ª and the bolts 64ᶜ which hold the parts 61 and 62 together. The vertical adjustment of the hopper bottom or table 52 is, as stated, and the lateral adjustment of the hopper and its feed mechanism is as follows. The base 66 slides laterally in a way 67 (see Fig. 1) and has on the under side a nut connecting with a screw shaft 68 (see Fig. 7) and the latter connects by gears 68ª and 69 with the shaft 25 already referred to.

For driving the feed chains 58, the studs 60ª are fitted with bevel pinions 70 meshing with bevel pinions 71 on the vertical shafts 72 and 72ª (see Fig. 1) and the shafts are also connected by yokes 73, while the gears 71 have a further connection with the shafts, which connection is as usual in such structures and is not shown, and so the gear mechanism can slide on the shafts 72 and 72ª. The two shafts 72 and 72ª are connected by means of the gears 74 and 75 and horizontal shaft 76. The shaft 72ª is longer than the shaft 72, and at its lower end (see Fig. 4) it connects by means of gears 77 and 78 with a counter-shaft 79, and the latter connects by gears 79ª and 80 with a vertical shaft 81, which extends downward as shown in Fig. 1 and connects by gears 82 and 83 with a horizontal shaft 84, this connecting in turn by gears 85 and 86 with a shaft 87, and the latter connects by gears 88 and 89 with the main driving shaft 39 already referred to. The gear 89 is mutilated so that the mechanism will stop momentarily while the abutment 57 is against the back of a board holding a board, as a, against the form. The upper end boards rest on the form bars. Thus the lower board of the hopper C can be fed forward with the form G in any convenient way, as for instance by having pawls on the bars 11 engaging the lower board in the manner shown in my application #422,068 filed simultaneously herewith, but this forms no part of my present invention.

Referring to Fig. 7 it will be seen that the bottom end board from the hopper D is fed forward directly beneath the feed of the side board in the hopper B. The feed mechanism is a chain feed substantially like that already described, but necessarily slightly modified. The hopper has a bottom frame 90 like the others, with an opening 91 on each side to permit the passage of the stock boards from the hopper, and also to provide for the movement of the abutments 92 which are attached to the feed chains 93, these operating like the feed chains 58 already described with the necessary modifications. The chains 93 run over idle sprocket wheels 94 on the shaft 95 at the outer ends of the feed chains, and also sprocket wheels 98 fixed to the studs 97 at the inner ends of the chains. The feed chains also run over idle sprockets 96 on the under side as shown in Fig. 7. The abutments 92 carry the end boards one by one forward beneath the plate 99 which serves as a support for the inclined guides 61—62 and directly over the table 100 and upon the feed plate 101 and 102 which at the moment the inner end board is moved inward, drops so that the board can slide upon it, and the board is thus placed in position below the form G and in registry with the two side boards which have been placed as already described. To provide for the necessary lateral adjustment to suit boxes of different widths, the two parts 101—102 of the end board plate are dovetailed together as shown in Figs. 5 and 7, and the part 101 has a dovetail connection as shown at 103 with the knuckle 65 (see Figs. 3 and 7) so that when the side board feed and the form are adjusted laterally, the table or plate 101—102 will be simultaneously and correspondingly adjusted. The vertical movement of the table or plate 101—102 is effected by the bent arm 104 (see Fig. 7) which extends downward beneath the table and is bifurcated or slotted as shown at 105 and provided with rollers 106 between which runs the cam bar 107 shown best in Fig. 5. This cam bar moves in a suitable support 108 at one end, is provided midway with a cam bend 109, and is at the other end attached to a lug 110 on the under side of the carriage body 17 which carries the form bars 11. When the form is moved forward therefore, and as soon as an end board has been carried forward from the table or plate 101—102 with the other parts of the box, the bend 109 will have been reached and the plate 101—102 will drop so as to permit a fresh end board to be fed forward, and the drive chains 93 are timed so that they will start at this moment, and the end board will be moved in position to register with the fresh end boards when they are placed in position.

To provide for a steady movement vertically of the table or plate 101—102, it has studs 111 on the under side (see Fig. 5) which enter bosses 112 on the frame of the machine.

To make it clear how the feed mechanism of the hopper D just described, is effected, we will now follow through the driving connections. One of the studs 98 is provided with a bevel pinion 113 meshing with a pinion 114 (see Fig. 5) on the vertical shaft 115, and the latter connects by pinions 116—117 with a horizontal shaft 118 which in turn connects by pinions 119—120 with the shaft 121 extending at right angles to the shaft 118, and the shaft 121 has a gear 122 meshing with the mutilated gear 123 on the main driving shaft 39. The mutilations in the gear are, it will be understood, made so as to time the feed and cause it to rest at desired intervals.

I have described how the two side boards and the end boards are fed to place, and I will now describe how the bottom board of the box is positioned and fed forward from the hopper E. This will be seen in Fig. 6, and it will be observed that the feed is precisely the same as it is for the side boards, and I will therefore use the same reference numerals to illustrate the feed. The driving mechanism is somewhat different and is as follows:—The studs carrying the sprocket wheels 59 are provided with bevel pinions 124 which mesh with pinions 125, feathered on the shafts 126 and 132. The shaft 126 connects by pinions 127 and 128 with a cross shaft 129 which connects by pinions 130—131 with the shaft 132. This shaft extends downward in a vertical direction and has at its lower end (see Fig. 1) a pinion 133 connecting with a pinion 134 on the shaft 84 already referred to. When the bottom board is fed forward like the side boards already described, it pitches over the inclined guides 61—62, and is then up-ended against the triangle guides 135 and rests temporarily upon the spring pressed dogs 135ª, from which it is pushed upon the drop plate 136 in position against the other parts of the box, and against the end of the form G which has been advanced to bring the box sides and ends into position. The bottom board which I have marked $a$, is pushed down by the push plate 137, which moves vertically against the guides 135, and is attached to a bracket 138 carried by the vertically moving rods 139 which are fast on the top of the vertically moving racks 140 (see Figs. 2 and 6). Each rack 140 extends down through a suitable guide 141 (see Fig. 6) and meshes with and is driven by a gear wheel 142 on the shaft 143, which shaft has a mutilated pinion 144 meshing with the mutilated rack 145 which slides horizontally beneath the machine in suitable ways 146, and is at its rear end connected to the carriage body 17. This makes the feeding of the box bottom positive, and is an improvement over the arrangement shown in another application filed simultaneously herewith, as the gravity feed is not quite so reliable. The mutilations of the rack 145 and pinion 144 are such as to cause the bottom board to be forced down at the exact moment that the other parts of the box are ready to receive it. The box is then carried forward ready to be nailed and directly above the drop plates 136, as described in the other application filed simultaneously herewith.

The fastening of the box parts is usually by nailing, and I have shown in a general way a nailing apparatus which will be hereinafter described, but so far as this present invention is concerned the box corners may be fastened in any approved way without affecting this invention, which relates wholly to the assembling of the box parts ready for fastening and around a suitable form.

Referring to Figs. 4 and 6 it will be seen how the drop plates 136 are actuated. They are hinged as shown in my other application referred to, and are operated by means of the yokes 137ª which slide in and out, and these are moved by the arms or curved pitmen 147 which are pivoted to a tilting lever 148 on the pivot shaft 149 which has a crank 150 connecting by a pitman 151 with the crank arm 151ª of the shaft 153, which has a second crank arm 152 carrying at the end a roller 154 which at the proper time is struck by the rounded end 145ª of one of the rack bars 145. This occurs as the rack bar reaches the end of its stroke and just as the nailing operation is completed, so that the plates 137 are dropped and the carriage 17 and form G are returned, and the completed box drops downward and is discharged by any suitable mechanism.

*Nailing mechanism.*—I have shown the nailing mechanism in a general way merely, as it forms no part of this invention, and I am covering it by a separate application. Referring to Figs. 2 and 6, the nails are fed from hoppers F through suitable ways 155 and through flexible tubes 156 to nail holders 157 which are properly grouped above the drop plates and at a point where the box is to be nailed. The nail holders are carried upon bars 157ª and are adjustable by means of the mechanism shown at 157ᵇ which I do not refer to in detail as it is shown in an application which I am filing herewith covering the nailing mechanism. It is also described in another application for box machines which I am also filing simultaneously herewith. To avoid confusion in the drawings, I call attention to the hopper actuating shafts 158 which are moved by the cranks 159 on the shafts 160, and these connect by pinions 161 and 162 with the vertical shafts 163 which at their lower ends connect by gears 164 and 165 with the counter-shaft 166. This has a sprocket wheel 167 at the end (see Figs. 2 and 4) driven by a chain 168 connecting with a sprocket wheel 169 on the main driving shaft 39. The nails are moved through the nail holders 157 by plungers 170, each series of plungers being carried by a head 171 which has a shank 172 (see Fig. 6) moving through a support 173. The shank 172 connects by toggle levers 174 with the head 172ª, and the toggle levers are actuated by the rod 175 which connects with the eccentric strap 176 of the eccentric 177, the latter being carried by the shaft 178. This as shown in Fig. 6, represents the eccentric mechanism and the back end of the machine. The shaft 178 connects by gears 179 and 180 with the shaft 181 which extends forward (see Fig. 4) and connects by gears 182 and 183 with the cross shaft 184, and the latter connects by gears 185 and 186 with the shaft 187 which extends still farther forward and connects by gears 188 and 189 with the counter shaft 190, and this connects by a pinion 191 with the mutilated gear 192 on the main driving shaft 39. One of the side nailing devices has its eccentric strap 176 connected directly with the shaft 181 (see Fig. 4) and the second side nailing device has the eccentric 176 on the shaft 178ª, which connects by gears 182ª and 183ª with the shaft 184 already referred to. As in the other application herein referred to, the nailing heads are mounted on sliding bases 193 (see Fig. 1) which are moved in and out by the screw shaft 194 so as to bring the nailing mechanism into the right close relation with the box being nailed. The screw shaft 194 is provided with a worm wheel 195 connecting with a worm 196 on the shaft 25 already described, and the worm wheel 195 is secured to its shaft by a set screw 195ª. When running regularly on a certain size and there is no need to adjust by hand, the set screw 195ª is loosened so that the worm wheel 195 runs free, but if it is desired to adjust by hand, the set screw is tightened. A crank 197 is secured to the shaft 194 by a set screw 197ª, and the crank connects with a pitman 198 which has a yoke 199 at the end, and this is provided with rollers 200 which are engaged by the arm 201 on the shaft 39, so that at each revolution of the main shaft the arm 201 striking the roller abutments 200, will actuate the screw shaft 194 and move the base 193 in and out thus controlling the movement of the nailing mechanism. As stated, I have not gone into this nailing mechanism in detail, because it forms no part of this invention.

From the foregoing description it will be seen that the carriage 17 and form bars 11 are moved regularly forward in the machine; that the movement causes the upper end board to be carried forward on the form from the hopper C; that the lower end board is fed forward nicely and accurately beneath the form; that the side boards are swung accurately to position so as to register with the end boards; that the bottom board, by a movement similar to the side boards, is placed against the end boards and side boards; that the parts are then nailed together; that the form is retracted and the box dropped, all in a practical and thoroughly automatic manner. It will be understood too, that the mutilated gearing shown provides for accurately timing these movements, so that no time is lost, but that the work goes forward steadily and regularly, that is to say, that on the return movement of the form and after the form has left the completed box, the two side boards and the bottom board are assembled in position; that the upper end board is in position at all times and is fed forward on the return movement of the form; that the lower end board is fed in on the forward movement of the carriage and after the cam bend 109 has passed the rollers 106, and that on the completion of these assembling movements, the nails are driven through the bottom board and into the side and end boards. It will be understood, however, that the bottom board is not assembled until the form has moved forward so as to bring the side and end boards up against it at the completion of the carriage stroke.

In this application I have shown the hoppers for containing the stock simply as plain hoppers, but it will be understood that the hoppers can be made adjustable by any usual means, but preferably as shown in my other application filed simultaneously herewith, to make them fit different sizes of stock.

Having thus fully described my invention, I claim as new and desire to secure by Letters Patent:—

1. In a box machine, the combination with the form, of the horizontally arranged chain feed for delivering stock against the form, the said feed comprising sprocket chains spaced apart, an inclined guide extending between the chains and opposite the lower part of the form, and abutments carried by the chains and adapted to carry stock to the inclined guide and against the form.

2. In a box machine, the combination with the vertically and laterally adjustable form, of the chain feed delivering opposite the side of the form, the inclined guide receiving stock from the chain feed and directing it to the form, a single group of mechanism for laterally adjusting the form and correspondingly moving the chain feed, and a mechanism for vertically adjusting the form.

3. The combination with the form, of the hopper at one side of the form, chains passing beneath the hopper and to a point opposite the form, an inclined guide having its upper end supported between the chains and its lower end at a point near the form, and transverse abutments carried by the chains and passing beneath the hopper.

4. In a box machine, the combination with the form and the hopper at one side thereof, of the table beneath the hopper, chains passing beneath the hopper and to a point opposite the form, an inclined and longitudinally adjustable guide extending from a point between the chains to a point opposite the form, abutments carried by the chains and movable beneath the hopper, means for adjusting the chain supports and form laterally, and means for adjusting the feed and guide vertically.

5. The combination with the form and the horizontally moving chain feed at one side thereof, of the abutments on the chains to carry forward the stock, and an inclined guide having one part pivoted between the chains and the other part pivoted opposite the form, the said guide having its two parts movable back and forth in relation to each other.

6. The combination with the form and the hopper at one side of the form, of the table beneath the hopper, movable chains spaced apart and supported opposite the form and outside the hopper, abutments carried by the chains and moving across the table top, and an inclined longitudinally adjustable guide having one part hinged to the inner end of the table and the other part hinged opposite the lower part of the form.

7. The combination with the form and means for feeding stock to the sides, bottom, and end thereof, of a plate adjustable as to size arranged beneath the form to support the bottom end board, and mechanism for dropping the plate to receive the said end board and then raising the plate to press the end board into position against the form.

8. The combination with the form, means for supporting and guiding the form, and the stock feed on one side of the form, of adjustable slide plates connected with the said supporting and guiding means and the stock feed, and a hand controlled screw mechanism for simultaneously adjusting the several slide plates, the supporting and guiding mechanism, the stock feed and slide plates.

9. The combination with the form and means for feeding stock to the sides, bottom, and end thereof, of a laterally adjustable plate supported beneath the form to receive the bottom end board, a chain feed to deliver end boards to the said plate, and a cam mechanism for dropping the plate to receive an end board and then raising it against the form.

10. The combination with the slide form and means for delivering stock to the sides, bottom, and end thereof, of a plate beneath the form to receive the bottom end board, and means actuated by the movement of the form to drop the plate to receive an end board and then raise it to press the end board against the form.

11. The combination with the movable form and means for delivering stock to the sides, bottom, and end thereof, of the plate beneath the form to receive a bottom end board, a cam bar moving with the form, and an operative connection between the cam bar and the plate, whereby the latter is dropped to receive the end board and then raised against the form.

WILLIAM T. McRAE.

Witnesses:
   WARREN B. HUTCHINSON,
   RALPH LANCASTER.